United States Patent
Murakami (10) Patent No.: US 8,208,793 B2
(45) Date of Patent: Jun. 26, 2012

(54) RECORDING APPARATUS

(75) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 12/762,147

(22) Filed: Apr. 16, 2010

(65) Prior Publication Data
US 2010/0266263 A1   Oct. 21, 2010

(30) Foreign Application Priority Data

Apr. 20, 2009 (JP) ................. 2009-102165
Apr. 2, 2010 (JP) ................. 2010-086388

(51) Int. Cl.
*H04N 9/88* (2006.01)
*H04N 5/94* (2006.01)
*H04N 5/93* (2006.01)
*G11B 27/00* (2006.01)

(52) U.S. Cl. ...................... 386/263; 386/278

(58) Field of Classification Search .......... 386/235–237, 386/263–267, 278–279; 360/31, 51, 69
See application file for complete search history.

(56) References Cited

U.S. PATENT DOCUMENTS

| 5,438,459 A * | 8/1995 | Suga et al. ................. 386/208 |
| 2008/0304385 A1 * | 12/2008 | Takashima ................. 369/53.17 |
| 2008/0307172 A1 * | 12/2008 | Abe ................. 711/156 |
| 2009/0135689 A1 * | 5/2009 | Van Der Brug et al. ... 369/47.14 |
| 2009/0268570 A1 * | 10/2009 | Go et al. ................. 369/47.44 |

FOREIGN PATENT DOCUMENTS

JP   2007-288557 A   11/2007

* cited by examiner

*Primary Examiner* — Thai Tran
*Assistant Examiner* — Nigar Chowdhury
(74) *Attorney, Agent, or Firm* — Carter, Deluca, Farrell & Schmidt LLP

(57) ABSTRACT

A recording apparatus includes a recording unit configured to record moving image data onto a plurality of recording media as a file, a detection unit configured to detect a recording error while the moving image data is being recorded onto the recording media, a control unit configured to control the recording unit according to an output of the detection unit, and when the moving image data is simultaneously recorded onto the recording media, if a recording error is detected, the control unit controls the recording unit such that the recording of the data onto the one recording medium is stopped while the recording onto another recording media is continued, and if a new file is generated in another recording media after recording of the moving image data onto the one recording medium is stopped, a new file is generated in the one recording medium and the recording is resumed.

8 Claims, 9 Drawing Sheets

RECORDING APPARATUS

BACKGROUND OF THE INVENTION

1. Field of the Invention

The present invention relates to a recording apparatus.

2. Description of the Related Art

Conventionally, there have been recording apparatuses used for recording a moving image signal or an audio signal onto a recording medium. Some of these recording apparatuses can record a moving image signal onto a plurality of recording media. For example, Japanese Patent Application Laid-Open No. 2007-288557 discusses a hard disk recorder, in other words, a domestic use digital versatile disc (DVD) recorder having a DVD drive as well as a built-in large capacity hard disk (HDD). The DVD recorder includes a function to copy a moving image signal or an audio signal of, for example, a television program once recorded in a HDD to a DVD inserted in the DVD drive.

On the other hand, in broadcasting environments, recording apparatuses with extremely high reliability with respect to recording of the moving image signal are required compared to domestic use recording apparatuses. Thus, some business-use video cameras include a function to simultaneously record a same moving image signal onto a plurality of recording media. By recording a same moving image signal onto a plurality of recording media, even if a moving image signal recorded onto one recording medium is not correctly reproduced or if a moving image signal is lost, the same moving image can be reproduced from a different recording medium.

Regarding such a recording apparatus, if an abnormal state occurs when a moving image signal is being recorded and thus the moving image signal is not correctly recorded onto a recording medium, a user of the apparatus is unable to recognize that the signal is not correctly recorded while the moving image is being recorded. Thus, the user needs to confirm, after the recording of the moving image, whether an abnormal state has occurred during the recording by reproducing the recorded moving image.

If an abnormal state occurs while a moving image is being recorded onto one recording medium and thus the moving image is not correctly recorded, a moving image signal is reproduced from the correctly recorded recording medium and the reproduced image signal is copied to another recording medium. However, copying a moving image signal, which contains an extremely large amount of data, takes a lot of time.

Further, in the case of a business-use recording apparatus, after the moving image signal is simultaneously recorded onto a plurality of recording media, one recording medium may be passed on to an editor for the purpose of editing while another recording medium is kept by the user. In such a case, if the copying of the data takes time, it is difficult to send the recording medium to the editor directly after the recording is finished.

SUMMARY OF THE INVENTION

The present invention is directed to a method that allows, when an abnormal state occurs during simultaneous recording of same data onto a plurality of recording media, easy copying of the same data onto a recording medium in which an error occurred.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
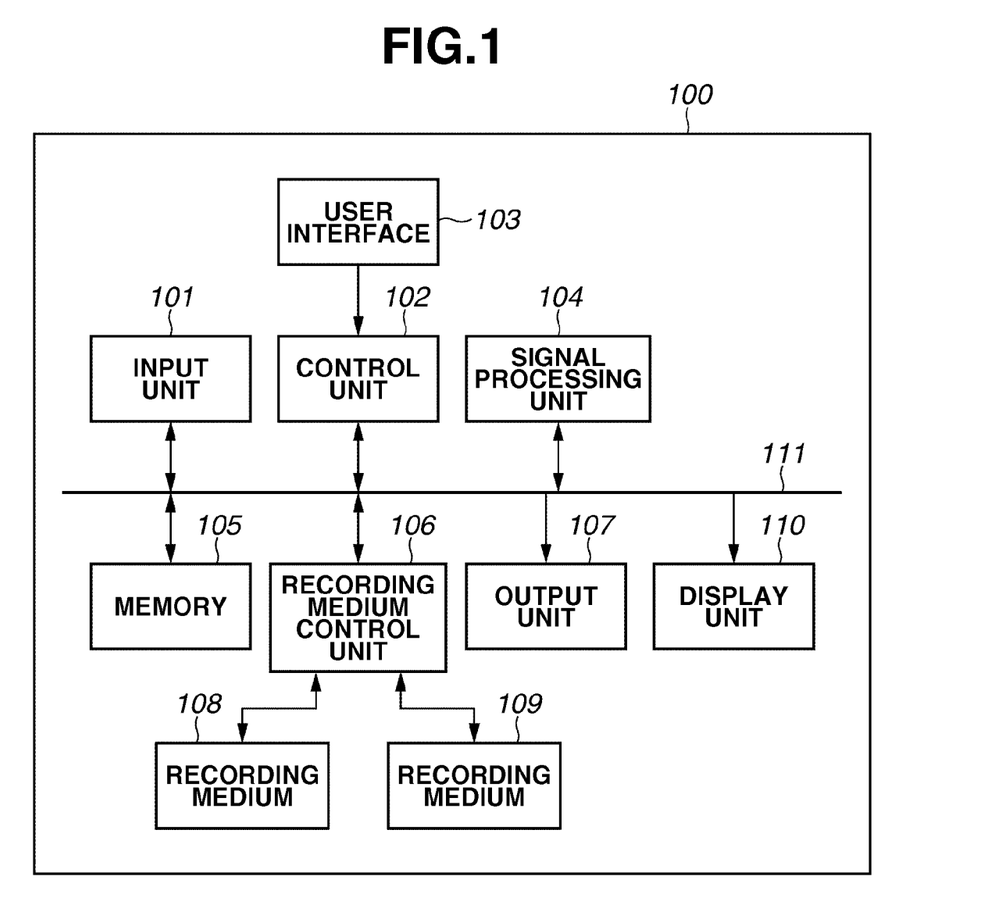
FIG. 1 is a block diagram illustrating a configuration of a recording apparatus according to an exemplary embodiment of the present invention.

FIG. 1 is a block diagram illustrating an example of a configuration of a recording apparatus 100 according to a first exemplary embodiment of the present invention.

In FIG. 1, an input unit 101 acquires and outputs a moving image signal or an audio signal. According to the present embodiment, the input unit 101 is used for inputting a moving image signal or an audio signal supplied from outside of the recording apparatus 100. However, since the input unit 101 can include an imaging unit or a microphone, a moving image signal or an audio signal may also be acquired via such units.

A control unit 102 controls the overall operation of the recording apparatus 100 according to an instruction sent from a user interface (UI) 103. The control unit 102, which includes a microcomputer and a memory, controls the recording apparatus 100 according to a program stored in the memory. Further, the control unit 102 includes a recording medium interface (IF) used for sending/receiving data or a command to/from a recording medium control unit 106. The UI 103 includes various switches operable by the user. When the UI 103 receives an instruction from the user, it notifies the control unit 102 that an instruction has been received. The UI 103 includes a power switch, a switch for starting/stopping recording, and also a switch for changing a mode of the recording apparatus 100.

In a recording process, a signal processing unit 104 performs coding of the moving image signal or the audio signal input by the input unit 101 using a publicly-known coding method such as MPEG and compresses the information amount. Further, the signal processing unit 104 performs processing necessary in recording the moving image signal or the audio signal. In a reproduction process, the signal processing unit 104 decodes the coded moving image signal or the audio signal and decompresses the information amount. Furthermore, in the recording process, after the moving image signal or the audio signal is coded, the signal processing unit 104 outputs information about the amount of data of the coded moving image signal or the coded audio signal to the control unit 102.

A memory 105 is used for storing a moving image signal or an audio signal. Each block of the recording apparatus 100 processes the moving image signal or the audio signal by obtaining access to the memory 105. Further, in addition to the moving image signal or the audio signal, various types of information such as file system information or management information is stored in the memory 105. The memory 105 also serves as a work memory for the control unit 102.

The recording medium control unit 106 records the moving image signal, the audio signal, or various types of information onto recording media 108 and 109 and reproduces the signal or the information from the recording media 108 and 109. At the time of recording, the recording medium control unit 106 records the moving image data or the audio data stored in the memory 105 onto the recording medium 108 or 109. Further, at the time of reproduction, the recording medium control unit 106 reproduces the moving image data or the audio data from the recording medium 108 or the recording medium 109 and stores it in the memory 105.

According to the present embodiment, each of the recording media 108 and 109 is an independent recording medium, in other words, it is a random access recording medium such as a hard disk (HDD) or a flash memory card. The recording medium control unit 106 manages the moving image, the audio data, or the various types of information recorded onto the recording media 108 and 109 as a file according to a file system such as FAT (File Allocation Table). Further, the recording medium control unit 106 includes a publicly known interface (IF) such as advanced technology attachment (ATA), and performs communication regarding data or various commands with the recording medium IF of the control unit 102.

Further, while the recording media 108 and 109 are easily inserted into and removed from the recording apparatus 100 by a loading/ejection mechanism (not shown), either of the recording media 108 and 109 can also be a built-in unit in the recording apparatus 100. As described below, the recording medium control unit 106 detects the state of the recording media 108 and 109 during the recording of the data and notifies the control unit 102 of their state.

When writing/reading of a data file with respect to the recording medium 108 or 109 is performed, the control unit 102 controls the recording medium control unit 106 to reproduce file system data (management data) from the recording medium 108 or 109 and stores the obtained data in the memory 105. This file system data includes information such as a file name, a file size, and a recording address of the data recorded onto the recording medium 108 or 109, and serves as management information used for managing the file. The control unit 102 controls the writing and reading of the file according to the file system data that is read out. The control unit 102 updates the file system data stored in the memory 105 according to the writing onto the recording medium 108 or 109. Then, the recording medium control unit 106 records the updated file system data onto the recording medium 108 or 109.

Further, by operating the UI 103, the user can change the operation mode of the recording apparatus 101 or start/stop the recording of the moving image data. Further, according to the present embodiment, if two recording media 108 and 109 are available, the user can arbitrarily select either of the recording media by operating the UI 103, and record the moving image data onto the selected recording medium. Further, according to the present embodiment, as described below, if both of the recording media 108 and 109 are available, a same moving image data can be simultaneously recorded onto the recording media 108 and 109.

Further, according to the present embodiment, the recording apparatus 100 has a copy function. According to this copy function, a moving image file recorded onto either of the recording media 108 and 109 can be read out and recorded onto the other recording medium.

Further, an output unit 107 outputs the reproduced moving image data or audio data so that it is input to an external display device of the recording apparatus 100. A display unit 110 displays a moving image or various types of information on a display device such as a liquid crystal panel. A data bus 111 is used for sending/receiving data and various control commands to/from each unit of the recording apparatus 100.

Figure 2:
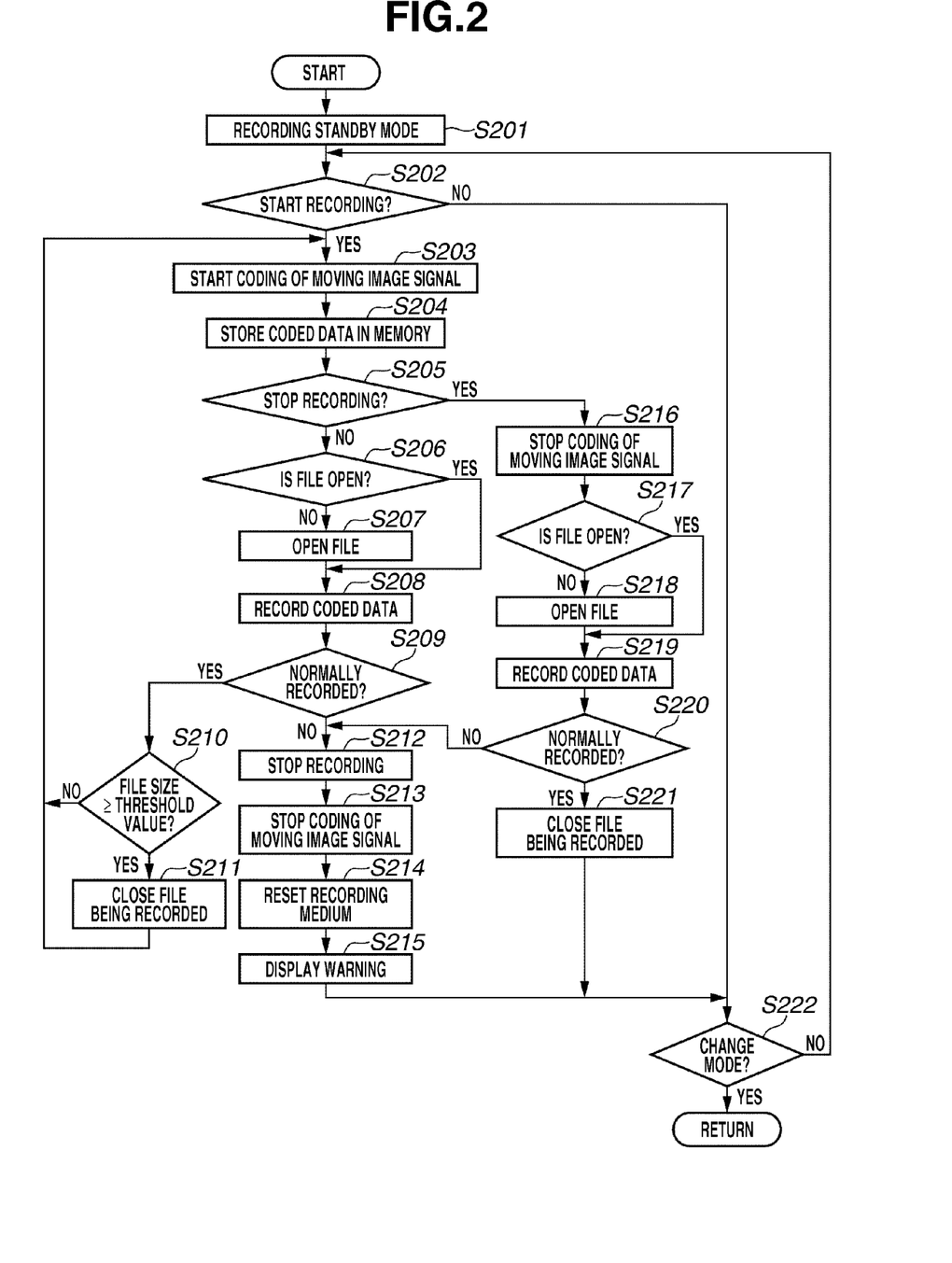
FIG. 2 is a flowchart illustrating recording processing.

Next, the recording operation of the present embodiment will be described referring to FIG. 2. FIG. 2 is a flowchart illustrating an example of a recording procedure of either of the recording media 108 and 109. The processing illustrated in FIG. 2 is performed under control of the control unit 102. A case where the moving image data is recorded onto the recording medium 108 is illustrated in FIG. 2. Further, although moving image data is used in describing the embodiment below, audio data is input together with the moving image data onto the recording medium.

In step S201, when the control unit 102 receives an instruction from the UI 103 to change the current mode to the recording mode of the moving image data, the control unit 102 changes the mode of the recording apparatus 100 to a recording standby mode and waits until a recording start instruction is given. While the recording apparatus 100 is in the standby mode, a moving image of the moving image data input by the input unit 101 is displayed on the display unit 110. In step S202, the control unit 102 determines whether a recording start instruction is received. If the control unit 102 determines that a recording start instruction is input by the UI 103 (YES in step S202), the process proceeds to step S203. If the control unit 102 does not determine that a recording start instruction is input (NO in step S202), then the process proceeds to step S222. In step S203, the signal processing unit 104 reads out the moving image signal input by the input unit 101 and stored in the memory 105, and starts coding of the moving image signal. In step S204, the control unit 102 stores the data coded by the signal processing unit 104 in the memory 105.

While the recording is being performed, processes in steps S204 to S211 are repeated. According to the present embodiment, a data rate of the data coded by the signal processing unit 104 is lower than a data rate used in the recording of the data onto the recording media 108 and 109. For this reason, according to the present embodiment, the coded data is temporarily stored in the memory 105.

Each time an amount of the coded data stored in the memory 105 reaches a first predetermined amount, the recording medium control unit 106 reads out the coded data from the memory 105 and records it onto the recording medium 108 or 109. When an amount of the coded data stored in the memory 105 is reduced to a second predetermined amount (an amount smaller than the first predetermined amount), the reading of the coded data from the memory 105 is temporarily halted, and the recording onto the recording medium 108 or 109 is suspended. The processes are repeated in this manner.

Each time one recording process regarding the recording medium is completed, the control unit 102 updates the file system data (management information) stored in the memory 105 according to the recording position of the coded data written this time. Then, the control unit 102 reads out the updated file system data from the memory 105 and records it onto the recording medium by controlling the recording medium control unit 106.

In step S205, the control unit 102 determines whether an instruction to stop recording is sent from the UI 103. If an instruction is not sent from the UI 103 (NO in step S205), the process proceeds to step S206 and the recording is continued. In step S206, the recording medium control unit 106 determines whether a file is already open in the recording medium 108. If the file is not yet open (NO in step S206), the process proceeds to step S207. In step S207, a file in which the coded data is to be newly recorded is generated and opened.

On the other hand, if the file is already opened in step S206 (YES in step S206), the process proceeds to step S208. In step S208, the recording medium control unit 106 writes the coded data in the current opened file. In step S209, the control unit 102 determines whether the writing of the coded data is performed normally. In other words, the control unit 102 determines whether a response from the recording medium control unit 106 indicating that the coded data has been normally written is received. If the recording is performed normally (YES in step S209), the process proceeds to step S210. In step S210, the control unit 102 compares a size (file size) of the coded data written in the opened file and a threshold value (file division threshold value) used for determining whether a file division is necessary, and determines whether the file size is greater than or equal to the threshold value.

According to the present embodiment, the control unit 102 monitors a file size of a file being recorded according to the notification sent from the recording medium control unit 106 or the signal processing unit 104. If the file size is smaller than the file division threshold value (NO in step S210), then the process returns to step S203 and the processing is repeated. However, since an opened file already exists in step S206, the process in step S207 is not performed, and the coded data is added to the file which is already opened. According to the present embodiment, the threshold value according to which the file is divided is determined according to an upper limit of a file size determined by the file system. In other words, according to the present embodiment, the threshold value of the file division is a predetermined amount smaller than the upper limit of the file size.

If a FAT32 file system is used, since the maximum value of a file size is 4 gigabytes (GB), the file division threshold value will be a predetermined value which is lower than the upper limit, which is 4 GB, and is, for example, 2 GB.

In step S210, if the file size is greater than or equal to the file division threshold value (YES in step S210), the process proceeds to step S211. In step S211, the control unit 102 outputs an instruction to divide the file and close the current opened file, to the recording medium control unit 106. Then, the process returns to step S203. In this case, since a file is not opened in step S206, a new file is opened in step S207. In this way, each time a file size reaches the file division threshold value during the recording of a moving image, the recording is continued while the file is being divided.

Further, in step S209, if a writing error is detected and the recording is not performed normally (NO in step S209), then the process proceeds to step S212. In step S212, the control unit 102 stops the writing processing onto the recording medium having the writing error. In step S213, the control unit 102 stops the coding processing of the moving image data. In step S214, the control unit 102 executes reset processing with respect to the recording medium (in this case, the recording medium 108) onto which the coded data has been recorded.

To be more precise, the control unit 102 resets an internal recording medium IF and controls the recording medium control unit 106 so that the power supplied to the recording medium 108 is turned off. Then, the control unit 102 controls the recording medium control unit 106 to turn on the power again and perform mount processing of the recording medium 108. In step S215, the control unit 102 generates warning information telling that the recording of the moving image data has been stopped due to a writing error and displays the generated warning on the display unit 110.

In this way, even if a recording error occurs during the recording of a moving image, the coded data corresponding to the file system data which has been updated just before the recording error has occurred and recorded onto the recording medium can be reproduced normally.

On the other hand, if an instruction for stopping the recording is sent from the UI 103 (YES in step S205), then the process proceeds to step S216. In step S216, the control unit 102 cancels the coding of the moving image data performed by the signal processing unit 104. In step S217, the control unit 102 determines whether a file in which the moving image data can be recorded is open. If the file is not open (NO in step S217), the process proceeds to step S218. In step S218, a new file for recording the coded data is generated.

A file is determined not to be open in step S217 when, after the recording is started, the control unit 102 receives a recording stop instruction before the coded data stored in the memory 105 reaches the predetermined amount. Alternately, a file is determined not to be open in step S217 when, after the file which has been recorded is closed in step S211, the control unit 102 receives a recording stop instruction before the coded data stored in the memory 105 reaches the predetermined amount.

On the other hand, if a file is already open in step S217 (YES in step S217), then the process proceeds to step S219. In step S219, the recording medium control unit 106 writes the coded data in the current open file. In the memory 105, the coded data is stored which is generated during the time from when the writing of the coded data has been stopped till when the instruction to stop the recording is received by the control unit 102. Thus, the coded data is read out from the memory 105 by the recording medium control unit 106, and the read-out coded data is written onto the recording medium 108.

In step S220, the control unit 102 determines whether the coded data is recorded normally. If the coded data is recorded normally (YES in step S220), the process proceeds to step S221. In step S221, the file which is being recorded is closed. Then, a reproduction order, which is managed by the management information, is changed and the changed order is recorded onto the recording medium. The reproduction order is changed so that a plurality of moving image files which have been recorded from when the recording start instruction is given till when the recording stop instruction is given are reproduced in the order of the recording. According to the present embodiment, if the coded data is divided into a plurality of files and recorded, the plurality of files including the moving images recorded from when the recording start instruction is given till when the recording stop instruction is given is managed as one scene.

In step S222, the control unit 102 determines whether an instruction to change the mode to that other than the recording mode or a power-off instruction is given by the UI 103. If the control unit determines that such an instruction is given (YES in step S222), then the process ends. If such an instruction is not given (NO in step S222), then the process returns to step S202.

Further, in step S220, if the control unit 102 detects a writing error (NO in step S220), then the process proceeds to step S212.

In this way, the recording of the moving image data onto the recording medium selected out of the two recording media 108 and 109 is performed.

Next, the reproduction processing will be described. When the control unit 102 receives an instruction to change the mode to the reproduction mode from the UI 103, the control unit 102 instructs the recording medium control unit 106 to detect a plurality of scenes recorded in either of the recording media 108 and 109 which has been selected. Then, a first moving image file of each of the scenes is reproduced and decoded by the signal processing unit 104, and stored in the memory 105. Then, the signal processing unit 104 generates a representative image of each scene using the decoded image signal of the first screen. Then, an index screen including representative images of the plurality of scenes is generated and displayed on the display unit 110.

The user operates the UI 103 and selects a representative image of the scene to be reproduced from the representative images displayed on the index screen and gives instructions for reproduction. When the control unit 102 receives the reproduction instruction, the control unit 102 controls the recording medium control unit 106 so that a plurality of moving image files of a scene corresponding to the selected representative image are reproduced. The recording medium control unit 106 reproduces the moving image files of the designated scene from the recording medium. The signal processing unit 104 decodes the reproduced moving image files, and displays them on the display unit 110 as well as outputs them from the output unit 107.

Next, simultaneous recording will be described. According to the present embodiment, same moving image data can be recorded onto the recording media 108 and 109. When the simultaneous recording is performed, the processing described above referring to FIG. 2 is performed for each recording medium. Thus, one file is generated for each of the recording media 108 and 109 and the coded data is recorded to each of the files. In this case, since the recorded coded data is the same, the timing of the file division of each recording medium will be the same, and the files obtained by the recording will be the same.

Figure 6:
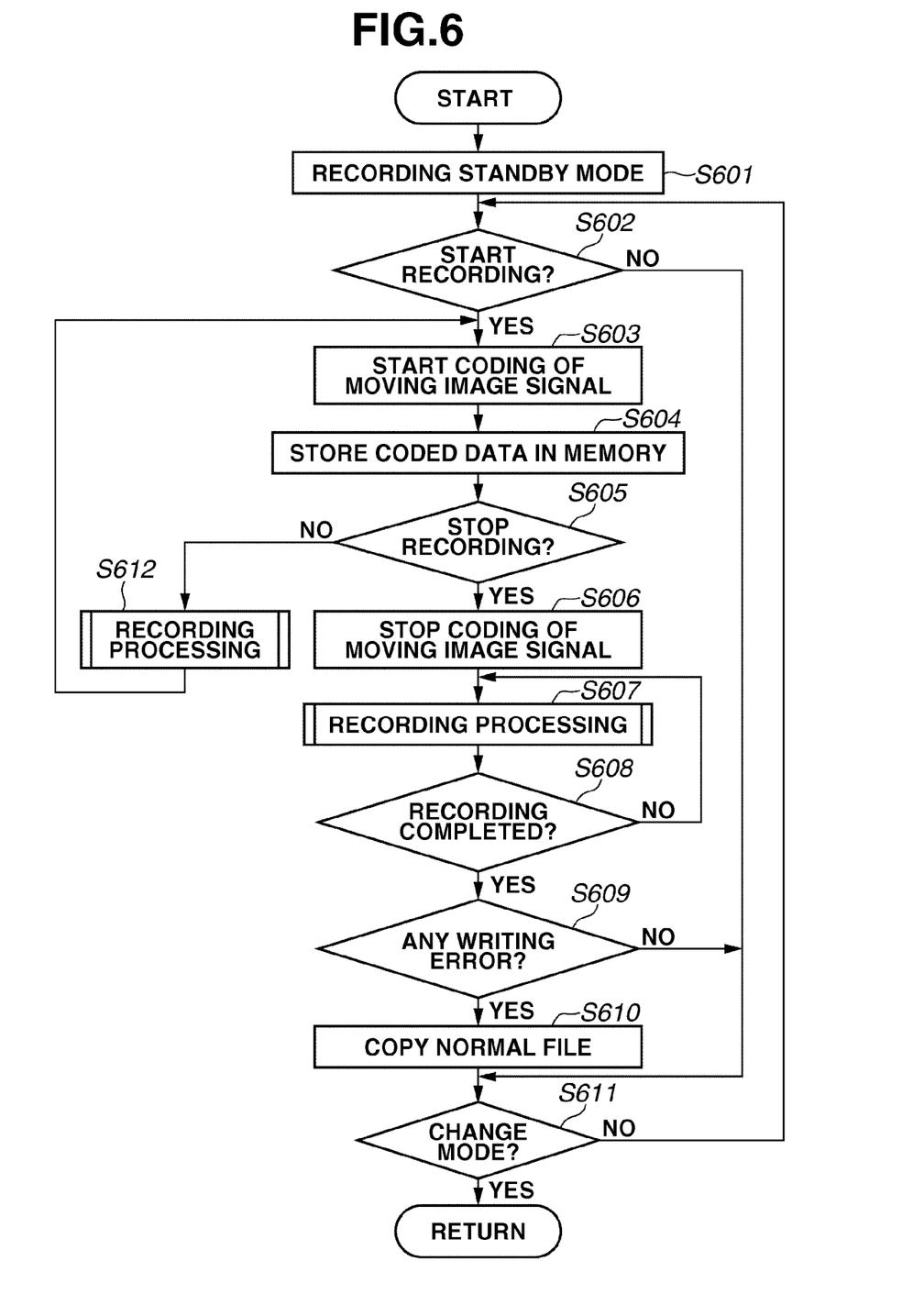
FIG. 6 is a flowchart illustrating simultaneous recording processing.

Next, the simultaneous recording operation of the present embodiment will be described referring to FIGS. 6 and 7. FIG. 6 is a flowchart illustrating an example of processing for the simultaneous recording of the recording media 108 and 109. The processing illustrated in FIG. 6 is based on control performed by the control unit 102.

In step S601, when the control unit 102 receives an instruction to change the current mode to the simultaneous recording mode from the UI 103, the control unit 102 changes the mode of the recording apparatus 100 to a recording standby mode and waits until a recording start instruction is given.

In step S602, the control unit 102 determines whether a recording start instruction is given. If the control unit 102 determines that a recording start instruction is input by the UI 103 (YES in step S602), the process proceeds to step S603. If the control unit 102 does not determine that a recording start instruction is input (NO in step S602), then the process proceeds to step S611. In step S603, the signal processing unit 104 reads out the moving image signal input by the input unit 101 and stored in the memory 105, and starts coding of the moving image signal. In step S604, the control unit 102 stores the data coded by the signal processing unit 104 in the memory 105.

In step S605, the control unit 102 determines whether it has received an instruction to stop the recording from the UI 103. If the instruction is not received (NO in step S605), then the process proceeds to step S612 and the recording processing is executed.

Figure 7:
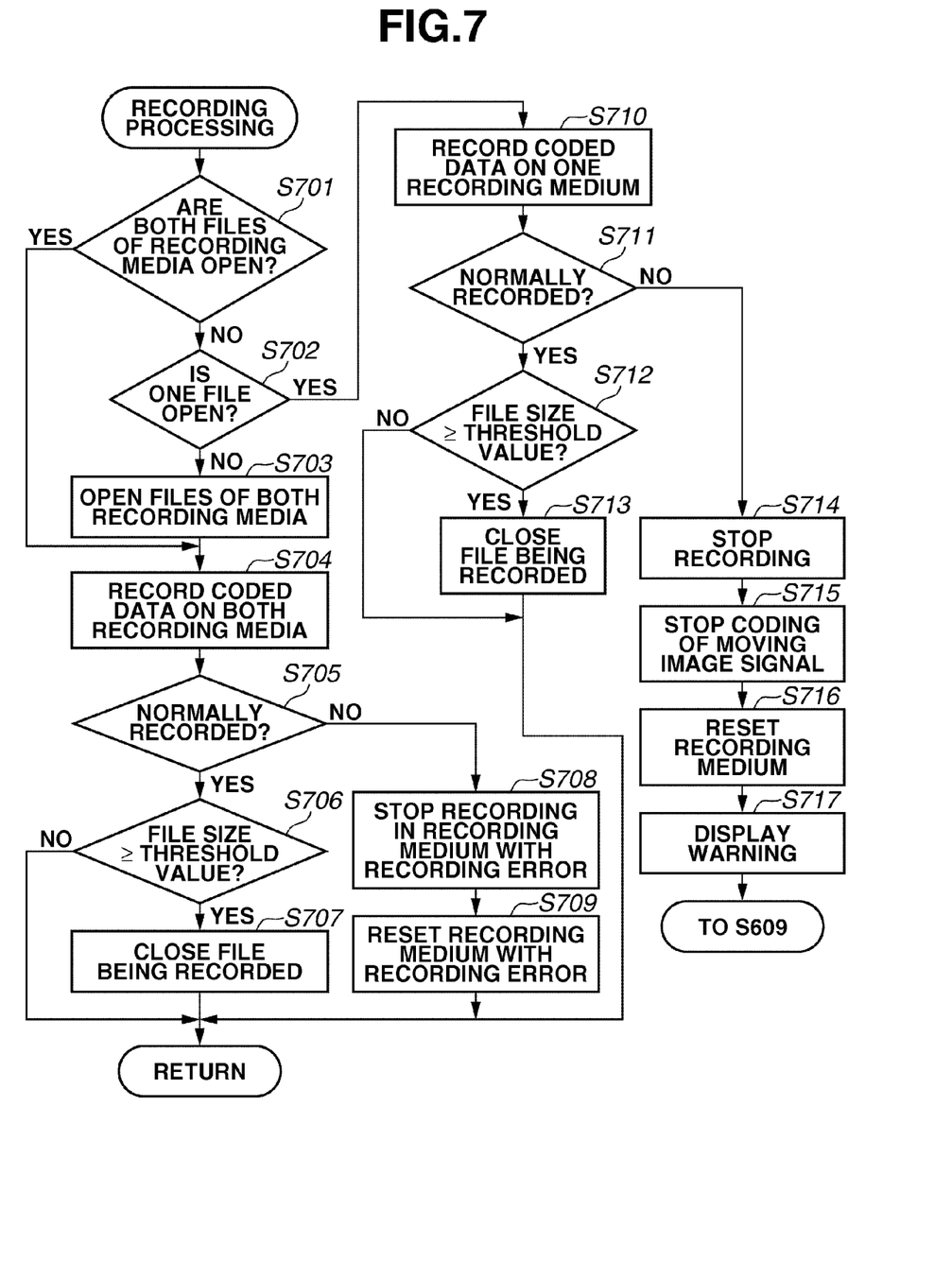
FIG. 7 is a flowchart illustrating recording processing.

FIG. 7 is a flowchart illustrating the recording processing in steps S607 and S612 in FIG. 6. In step S701, the recording medium control unit 106 determines whether both of a file in the recording medium 108 and a file in the recording medium 109 are open. If either or both of the files are not open (NO in step S701), the process proceeds to step S702. In step S702, the recording medium control unit 106 determines whether the file in the recording medium 108 or the file in the recording medium 109 is open.

As a result of the determination, if both of the files are closed (NO in step S702), the process proceeds to step S703. In step S703, the control unit 102 newly generates and opens a file for recording the coded data for each of the recording media 108 and 109. In step S704, the coded data is written in the current opened file of each recording medium.

If the reset processing performed in step S709 is not completed as described below, and a file is not generated, the generation of the file and the writing of the coded data will not be started until the reset processing is completed. During this period, the coded data is sequentially stored in the memory 105.

In step S701, if both of the files are open (YES in step S701), the process proceeds to step S704. In step S704, the recording medium control unit 106 writes the coded data in both the current opened files of the recording media.

According to the present embodiment, if a recording error of one recording medium occurs while simultaneous recording is being performed, the recording of the coded data onto the recording medium with the writing error is temporary stopped, and the reset processing is executed. During that time, the recording of the coded data onto the other recording medium is continued. After the reset processing of the recording medium with the writing error is completed, when a size of the file of the other recording medium reaches a threshold value and a new file is opened, a new file is also generated for the recording medium whose recording has been suspended. Then, simultaneous recording is resumed.

In step S705, the control unit 102 determines whether the writing of the coded data onto both of the recording media is performed normally. As a result of the determination, if the writing of the coded data has been completed normally (YES in step S705), then the process proceeds to step S706. In step S706, the control unit 102 compares the size of the coded data written in the file of each recording medium and the file division threshold value, and determines whether the file size is greater than or equal to threshold value. If the file size is smaller than the file division threshold value (NO in step S706), the process returns to the processing in FIG. 6. On the other hand, if the file size is greater than or equal to the file division threshold value (YES in step S706), the process proceeds to step S707. In step S707, the control unit 102 closes the current open file, and then the process returns to the processing in FIG. 6.

In step S705, if a writing error of the recording medium is detected and the writing is not performed normally (NO in step S705), the process proceeds to step S708. In step S708, the control unit 102 instructs the recording medium control unit 106 to stop the writing onto the recording medium with the writing error. In step S709, the control unit 102 executes the reset operation with respect to the recording medium with the recording error.

When the writing error occurs, the recording medium control unit 106 notifies the control unit 102 of the name of the file which is being recorded onto the recording medium without the recording error. Further, the recording medium control unit 106 also notifies the control unit 102 of a name of a file whose recording has been finished before the occurrence of the writing error, or a name of a file whose recording of the coded data has been resumed after the occurrence of the writing error. In this way, the control unit 102 can detect a moving image file which has been recorded onto the recording medium without the writing error while the recording to the recording medium with the writing error has been stopped. Further, the control unit 102 can detect a file that is recorded before or after the file with the writing error.

In step S702, if one of the files is open (YES in step S702), then the process proceeds to step S710. In step S710, the recording medium control unit 106 writes the coded data in the file that is open. In step S711, the control unit 102 determines whether the writing of the data onto the recording medium to which the coded data is being written is performed normally.

If the writing is performed normally (YES in step S711), then the process proceeds to step S712. In step S712, the control unit 102 compares the size of the coded data written in the file in the recording medium and the file division threshold value, and determines whether the file size is greater than the file division threshold value. If the file size is smaller than the file division threshold value (NO in step S712), the process returns to the processing in FIG. 6. If the file is greater than or equal to the file division threshold value (YES in step S712), the process proceeds to step S713. In step S713, the current open file is closed, and then the process returns to the processing in FIG. 6.

In step S711, if the recording medium control unit 106 detects a writing error with respect to the recording medium and the writing is not performed normally (NO in step S711), then the process proceeds to step S714. In step S714, the recording medium control unit 106 cancels the writing onto the recording medium with the writing error. In step S715, the signal processing unit 104 stops the coding processing of the moving image data. In step S716, the control unit 102 executes the reset operation of the recording medium with the recording error. In step S717, a warning that the recording has been stopped due to a writing error is displayed on the display unit 110, and then the process proceeds to step S611 in FIG. 6.

According to the present embodiment, if a writing error occurs while only one of the recording media is being recorded, the recording of the moving image data is stopped and a warning is displayed.

Referring back again to FIG. 6, in step S605, if the control unit 102 receives an instruction to stop the recording via the UI 103 (YES in step S605), the process proceeds to step S606. In step S606, the control unit 102 cancels the coding of the moving image data performed by the signal processing unit 104. In step S607, the recording processing illustrated in FIG. 7 is executed. In step S608, the control unit 102 determines whether all the coded data stored in the memory 105 is recorded onto the recording medium. If the writing is not yet completed (NO in step S608), then the process returns to step S607, and the writing is continued.

In step S608, if the writing is completed (YES in step S608), the process proceeds to step S609. In step S609, the control unit 102 determines whether a writing error has occurred during the simultaneous recording. If the writing is performed normally (NO in step S609), the process proceeds to step 611. In step S611, the control unit 102 determines whether an instruction to change the recording mode to a different mode or a power off instruction is input by the UI 103. If such an instruction is input (YES in step S611), the process ends. If such an instruction is not input (NO in step S611), then the process returns to step S602.

Further, in step S609, if the control unit 102 determines that a writing error has occurred (YES in step S609), then the process proceeds to step S610. In step S610, the recording medium control unit 106 detects the moving image file which was being recorded onto a recording medium when a writing error occurred with respect to the other recording medium. The moving image file is read out from the normally recorded recording medium and recorded onto the recording medium with the writing error. Thus, a normal moving image file is copied.

Further, as described above, the coded data written before the writing error has occurred is recorded normally. However, when the copying of the normal file is performed, since the file with the writing error is no longer necessary, the moving image file with the writing error is deleted from the recording medium.

Further, if a writing error with respect to one recording medium occurs in step S711 and the recording is stopped, after the recording medium is reset, a moving image file which was being recorded while the recording has been stopped is copied to the other recording medium in step S610.

Figure 3:
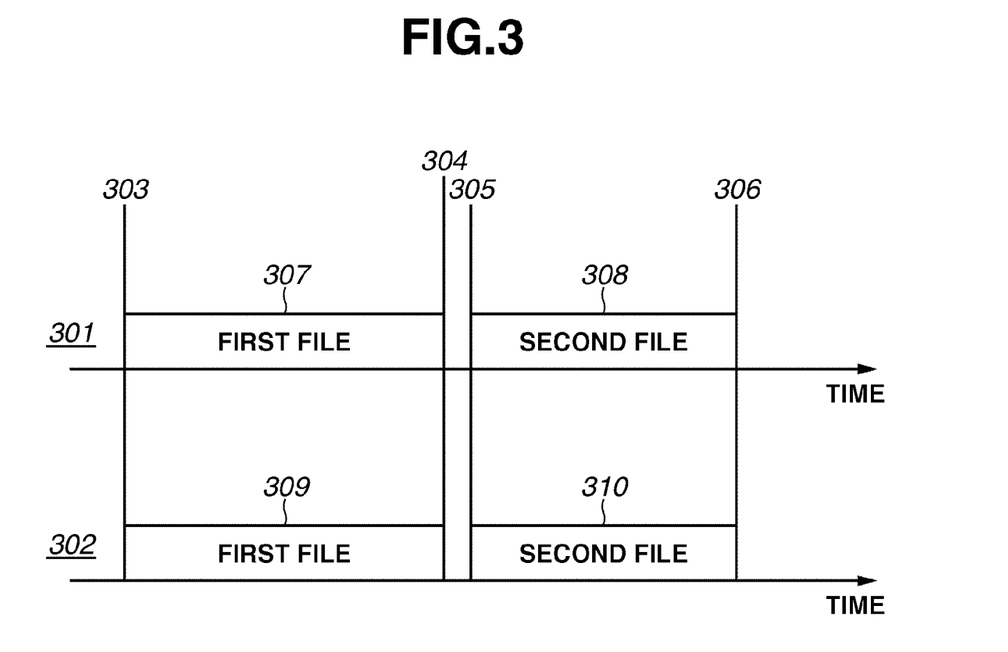
FIG. 3 illustrates a state of a file recorded onto a recording medium.

FIG. 3 illustrates the moving image files recorded onto the recording media 108 and 109 in the simultaneous recording mode.

In FIG. 3, the horizontal axis represents time. Files 301 and 302 are moving image files stored in the recording media 108 and 109, respectively. When a recording start instruction is given at timing 303, a file is generated for each of the recording media 108 and 109, and first moving image files 307 and 309 are recorded. The recording of the coded data is continued until timing 304 when the file size is determined to be greater than the file division threshold value. Then the recording of the coded data in each of the first moving image files 307 and 309 is canceled. The coded data recorded in each of the recording media is the same, and the file sizes of the moving image files 307 and 309 are also the same. Thus, the timing the recording is canceled will also be the same.

If the recording is continued after the recording of the moving image file is stopped, since a file which is being recorded does not exist when the next coded data is written, a second file is generated for each of the recording media at timing 305. This timing is the same for the recording media 108 and 109.

Similar processing is performed for second moving image files 308 and 310. If a recording stop instruction is given at timing 306 before the size of the files reaches the threshold value, the coding is stopped and the writing of the rest of the coded data is performed. Then, the recording of the moving image files is stopped. The recording of the moving image files is stopped at the same timing. When a plurality of recording media is recorded, same processing is performed simultaneously for each recording medium.

Figure 4A:
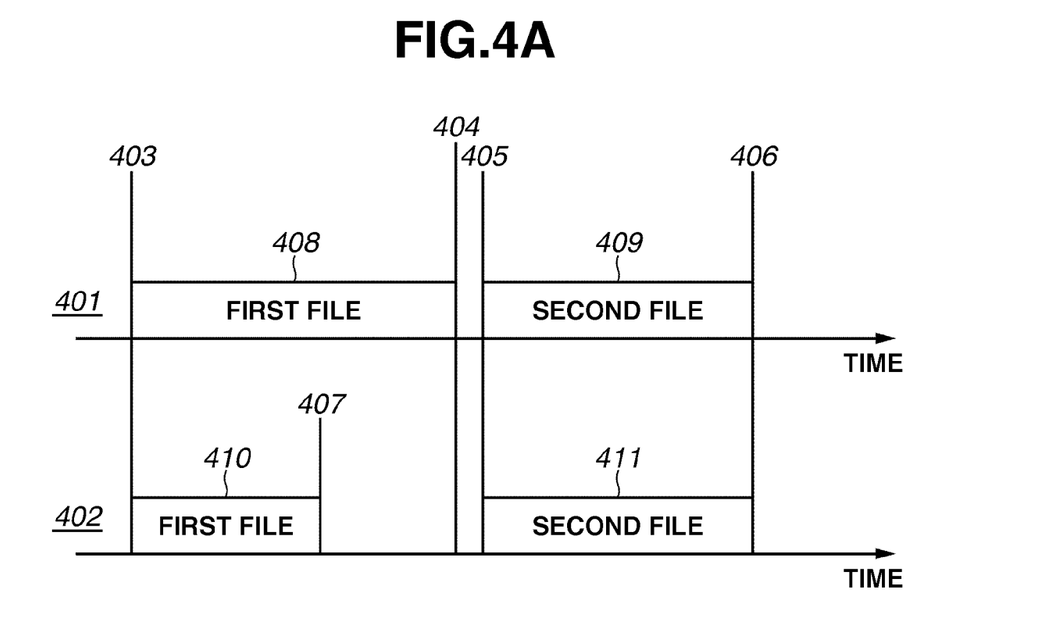
FIGS. 4A and 4B illustrate a state of a file recorded onto a recording medium.

The above-described case is where the recording is performed normally. Next, a case where an abnormal state occurs during the recording will be described. FIG. 4A illustrates a state of the files recorded onto the recording media when a writing error occurs with respect to the recording medium 109 in a simultaneous recording mode.

In FIG. 4A, the horizontal axis represents time. Further, in FIG. 4A, files 401 and 402 are moving image files recorded onto the recording media 108 and 109. When a recording start instruction is given at timing 403, a file is opened for each of the recording media 108 and 109, and first moving image files 408 and 410 are recorded. Although the recording of the coded data is continued after the recording is started, since a writing error occurs with respect to the recording medium 109 at timing 407 before the size of the first moving image files 408 and 410 reaches the threshold value, the writing of the coded data onto the recording medium 109 is stopped and the recording medium 109 is reset.

On the other hand, the recording of the coded data onto the recording medium 108 is continued after the timing 407. In this state, only the first moving image file 408 of the recording medium 108 is open. When the writing onto the recording medium 109 is stopped, the recording medium control unit 106 informs the control unit 102 of the identification (file name) of the first moving image file 408 which is being recorded onto the recording medium 108.

Then, as illustrated in FIG. 4A, when the file size of the first moving image file 408 recorded onto the recording medium 108 reaches the file division threshold value at timing 404, the first moving image file 408 is closed. At this point in time, each of the two recording media does not have an open file.

Then, if the reset of the recording medium 109 is completed during the time between the timing 407 and 404, then at timing 405, second moving image files 409 and 411 are generated for the recording media 108 and 109, and the coded data is recorded in the files. From this time, the coded data is recorded onto the two recording medium. Then, at timing 406, if a recording stop instruction is received, the coding is stopped and after the writing of the rest of the coded data is completed, the files are closed. When the second moving image file 411 is generated in the recording medium 109, the recording medium control unit 106 notifies the control unit 102 of the file name of the second moving image file 411.

When the recording of the moving image is stopped, the control unit 102 detects that a recording error has occurred during the recording of the first moving image file 410. The control unit 102 also detects the first moving image file 408 which is being recorded onto the recording medium 108 when the writing error has occurred. Then, according to the recording medium control unit 106, the first moving image file 408 is reproduced from the recording medium 108 and recorded onto the recording medium 109. In this way, the first moving image file 408 is copied. Further, the first moving image file 410 is deleted from the recording medium 109.

Then, the control unit 102 changes the reproduction order of the moving image files according to the management information so that the second moving image file is reproduced after the first moving image file copied to recording medium 109.

Figure 8:
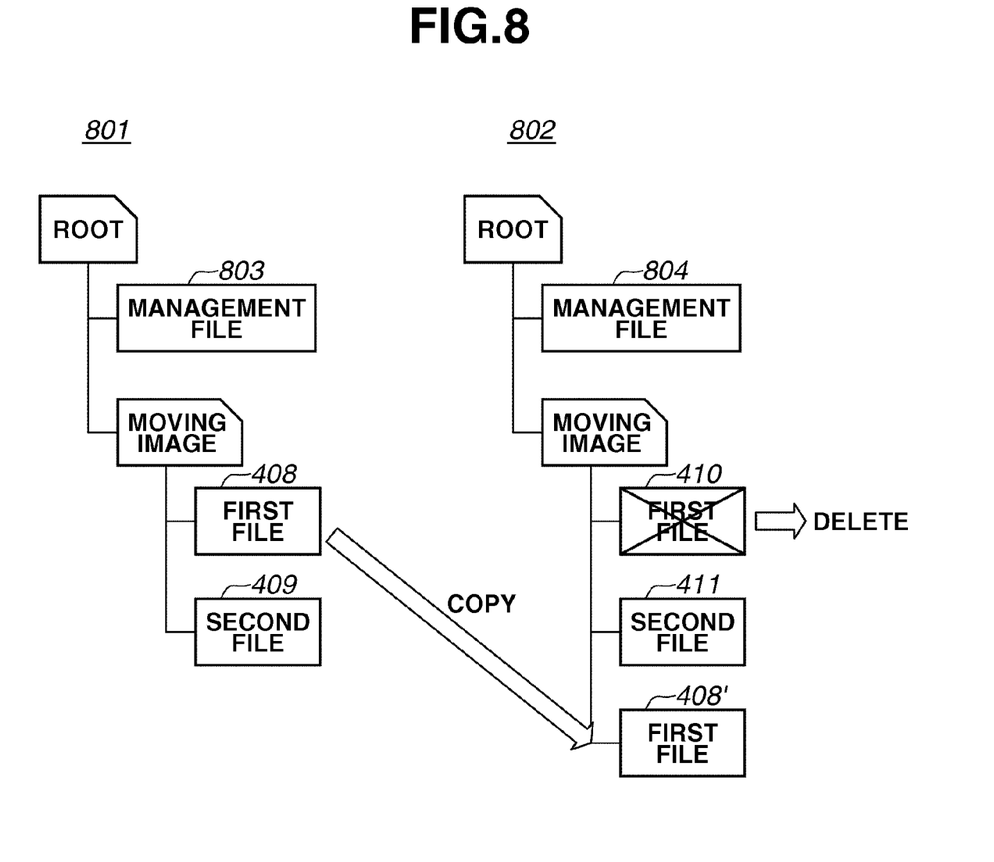
FIG. 8 illustrates files recorded onto recording media.

FIG. 8 illustrates a state of each recording medium when the moving image file is recorded as illustrated in FIG. 4A.

In FIG. 8, a state 801 represents the state of the recording medium and a state 802 represents the state of the recording medium 109. A management file 803 includes management information about a reproduction order of the moving image files recorded onto the recording medium 108. Further, a management file 804 includes management information about a reproduction order of the moving image files recorded onto the recording medium 109. The management files 803 and 804 are respectively stored in a root directory.

The first moving image file 408 and the second moving image file 409 are stored in a moving image directory of the recording medium 108. The first moving image file 410 and the second moving image file 411 are stored in a moving image directory of the recording medium 109. After the recording of the moving image file is stopped, the first moving image file 408 is reproduced from the recording medium 108 and recorded onto the recording medium 109 as a first moving image file 408'.

At this time, a new file name can be used for the moving image file obtained by the copying, or a file name same as the first moving image file 410 (original file) can be used. Then the reproduction order of the moving image files in the management file 804 is changed so that the second moving image file 411 is reproduced after the first moving image file 408' obtained by the copying.

According to the present embodiment, even if a writing error occurs, recording can be resumed for each file. Thus, two recording media that contain the same data can be obtained shortly after the completion of the recording since only the file with the error needs copying.

Further, if a writing error occurs with respect to one recording medium, since the files are generated in the two recording media at the same time, only the file corresponding to the file with the writing error is copied.

Further, according to the present embodiment, a writing error occurred with respect to the recording medium 109. If a writing error occurs with the recording medium 108, the moving image file being recorded onto the recording medium 109 at the time the writing has been cancelled is copied onto the recording medium 108.

Furthermore, according to the present embodiment, the moving image data is simultaneously recorded onto two recording media, however, the data can be recorded onto three or more recording media.

Further, according to the present embodiment, the threshold value of the file division is a value of a predetermined size. However, for example, a file can be divided each time the moving image data of a predetermined period of time is recorded. In this case, the threshold value will be a predetermined recording time. The control unit 102 counts the time that elapsed from the time a new file was generated and the recording was started. After a lapse of a predetermined time interval, the control unit 102 sends an instruction to the recording medium control unit 106 to divide the file.

Further, according to the present embodiment, the apparatus is used for recording moving image data or audio data, however, the present invention is also applicable to an apparatus in which other input information data is recorded.

According to the first exemplary embodiment, an error occurred while the coded data is being written in a file. According to a second exemplary embodiment, the recording medium is a hard disk drive (HDD) and the writing processing is not properly performed due to a retracted head. The configuration of the recording apparatus according to the present embodiment is similar to that of the recording apparatus illustrated in FIG. 1 of the first exemplary embodiment, and the recording processing is also similar to that illustrated in FIGS. 2 and 6. Thus, their descriptions are omitted.

In the case of a HDD, data is recorded onto a HDD and reproduced therefrom according to a rotation of a magnetic disk, which is a recording medium, at a high speed. Data is recorded and reproduced while a magnetic head moves very close over the disk surface in the radial direction. Since the magnetic head operates very close to the disk surface when the data is recorded or reproduced, if the HDD is dropped onto the floor while it is operating, the impact may cause the magnetic head to contact the disk surface and the magnetic head or the disk may be damaged.

Thus, in order to prevent the damage of the magnetic head or the disk when the HDD is dropped, a head retracting mechanism is provided. According to this mechanism, the magnetic head is retracted from the disk surface when the HDD is dropped so that it does not contact the head.

If the magnetic head is retracted during the recording, since the data cannot be written while the magnetic head is retracted, the coded data is temporarily stored in the memory 105 and the writing is resumed after the magnetic head returns to the operative position. Thus, a capacity necessary in storing the data while the magnetic head is retracted is included in the capacity of the memory 105.

However, if the fall time is long and the time the magnetic head is retracted is long, the capacity of the memory 105 may be full. In this case, if the recording apparatus has only one recording medium for recording, the coding is cancelled and the recording of the video recording is discontinued.

A case where the recording medium 108 is a flash memory card and the recording medium 109 is a HDD will be described referring to FIG. 4A. If a drop is detected during the recording of the first file and the magnetic head of the HDD is retracted, then the data cannot be written onto the recording medium 109 while the magnetic head is retracted.

On the other hand, since the recording medium 108 is a flash memory and does not include a recording head, the writing can be continued. Thus, as is with the first exemplary embodiment, the recording onto the recording medium 109 is temporarily cancelled while the recording onto the recording medium 108 is continued.

If the file size of the first file of the recording medium 108 exceeds the file division threshold value, the first file is closed. When the second file of the recording medium 108 is generated, the recording processing of the recording medium 109 is also started, and the second file of the recording medium 109 is generated. Accordingly, the second files of the recording media 108 and 109 are opened, and the normal processing is continued.

After then, if an instruction to stop recording is received, the second files are closed. If a writing error is determined, a file corresponding to the file with the writing error is copied. As is with the first exemplary embodiment, the first file of the recording medium 108 is copied to the first file of the recording medium 109.

According to the above-described processing, even if writing is discontinued due to a retracted magnetic head of a HDD, a same file can be recorded onto the recording media 108 and 109.

According to a third exemplary embodiment, the recording is performed according to a data format called MXF (Material Exchange Format). Since the configuration of the recording apparatus according to the present embodiment is similar to that of the recording apparatus illustrated in FIG. 1, its descriptions are omitted.

Figure 5:
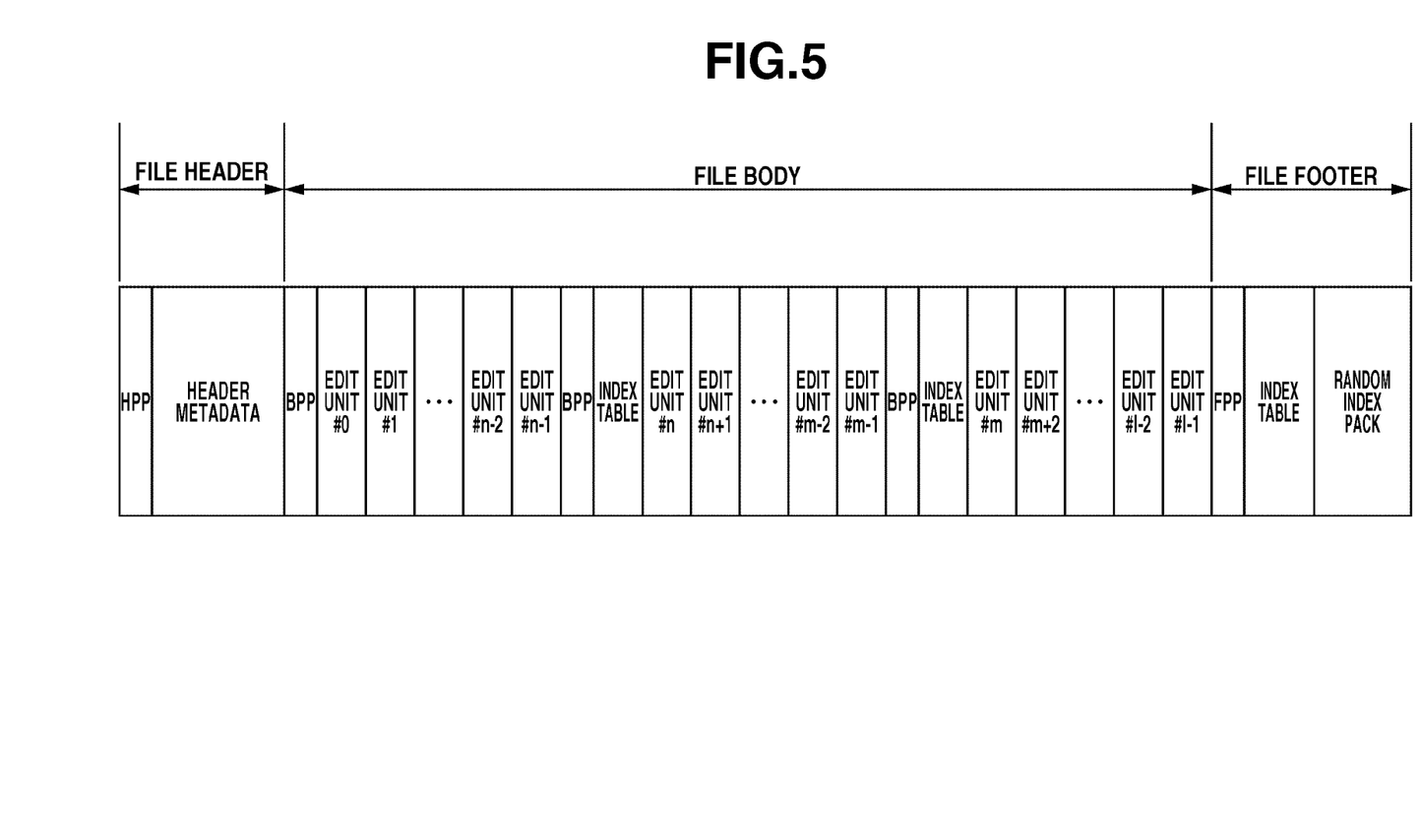
FIG. 5 illustrates an example of a mapping structure of an MPEG stream in an MXF data format.

FIG. 5 illustrates an example of a mapping structure of an MPEG (Movie Pictures Experts Group) stream in an MXF (Material Exchange Format) data format.

The MXF is a file format standard defined by SMPTE (Society of Motion Picture and Television Engineers). The mapping structure of an MPEG stream illustrated in FIG. 5 is defined by SMPTE-381M. A file with frame-interleaved video data and audio data according to the MXF standards such as SMPTE-381M is hereinafter called an interleave MXF.

As illustrated in FIG. 5, an interleave MXF file includes a file header, a file body, and a file footer.

The file header includes a header partition pack (HPP) and header metadata. The data used for identifying the header, format information of the data set in the file body, and information of the file format are stored in the HPP. Further, storage start offset information of a footer partition pack (FPP) is also stored in the HPP. The FPP, which is described below, indicates footer address. Further, metadata such as generation time and date is stored with respect to every file in the header metadata.

The file body includes a body partition pack (BPP), an edit unit (EU), and an index table. The BPP includes data used for identifying the body, information of a partition pack (HPP or BPP) arranged right before the BPP, and storage start offset information of the BPP and FPP. The regions other than the BPP include 0 or 1 Index Table and 1 or a plurality of EUs. Data of each frame is stored in the EU. Information of the EU included in the preceding region partitioned by the BPP is stored in the Index Table.

The file footer includes a footer partition pack (FPP), an index table, and a random index pack (RIP). Data used for identifying the footer, information of the BPP arranged right before the FPP, and storage start offset information of the FPP is stored in the FPP. A predetermined header and then storage start offset information of the interleave MXF file of each partition pack are stored in this order in the RIP. Information of the data size of the RIP itself is stored at the end of the RIP.

Further, a fill item (NULL data) used for boundary adjustment is arranged directly after each element (partition pack, index table, etc.) included in the interleave MXF file. According to the present embodiment, in order to simplify the description, the NULL data is not shown and its description is omitted.

A group of EUs for each region partitioned by the BPP is termed an essence container. The essence container corresponds to the video data and the audio data actually reproduced according to the interleave MXF file.

Now, a case where a same data is recorded onto a plurality of recording media having the MXF file format described above as the recording format will be described. Since the recording procedures are similar to those described with reference to the flowcharts illustrated in FIGS. 2 and 6 according to the first exemplary embodiment, their descriptions are omitted.

However, if the data is recorded as an MXF file, when the file is closed, the storage start offset information of the FPP needs to be stored in the HPP and the storage start offset information of the FPP needs to be stored in the BPP. This is because the FPP, which is arranged at the end of the file, is generated just before the file is closed, and accordingly, the storage start offset value of the FPP is not determined until the file is closed.

If a writing error occurs when the coded data is written in the first file of the recording medium 109 as illustrated in FIG. 4A, the first file of the recording medium 109 is closed and the recording will be temporarily stopped. On the other hand, the recording of the first file of the recording medium 108 is continued, and when the file size is greater than or equal to the file division threshold value, the first file is closed.

At this time, since the storage start offset value of the FPP is determined, the storage start offset information of the FPP is stored in the HPP and the storage start offset information of the FPP is stored in the BPP. Then, the first file is closed.

Next, when a recording stop instruction is received while the second file is being recorded, the second file is closed and then a file corresponding to the error file is copied. At this time, the storage start offset information of the FPP is stored in the HPP and the storage start offset information of the FPP is stored in the BPP in the first file of the recording medium 108. Thus, the first file of the recording medium 108 is copied as the first file of the recording medium 109.

According to the present embodiment, if a writing error occurs when an MXF file is being written, a file including the storage start offset of the FPP in the HPP and the storage start offset of the FPP in the BPP is copied. Thus, the process of storing the storage start offset information of the FPP in the first file of the recording medium 109 can be omitted. As a result, the time necessary in copying the file after the recording is stopped can be reduced.

Next, a fourth exemplary embodiment will be described. According to the present embodiment, the configuration of the recording apparatus is similar to the recording apparatus described with reference to FIG. 1, and the basic processing is similar to the first exemplary embodiment. According to the present embodiment, however, the processing of the simultaneous recording is different from the first exemplary embodiment. According to the first exemplary embodiment, if a writing error is detected during simultaneous recording, the recording onto the recording medium with the writing error is stopped and the reset processing is executed. Then, when a file size of the recording medium without the writing error reaches the threshold value and a new file is generated, a file is generated also for the recording medium whose writing has been stopped due to the error at the same time, and the recording of the coded data is resumed.

According to the present embodiment, if a writing error is detected during simultaneous recording, the recording onto the two recording medium is stopped. Then, the recording medium with the writing error is reset. When the reset processing is completed, a new file is generated for each of the recording media, and the simultaneous recording is started again.

Figure 9:
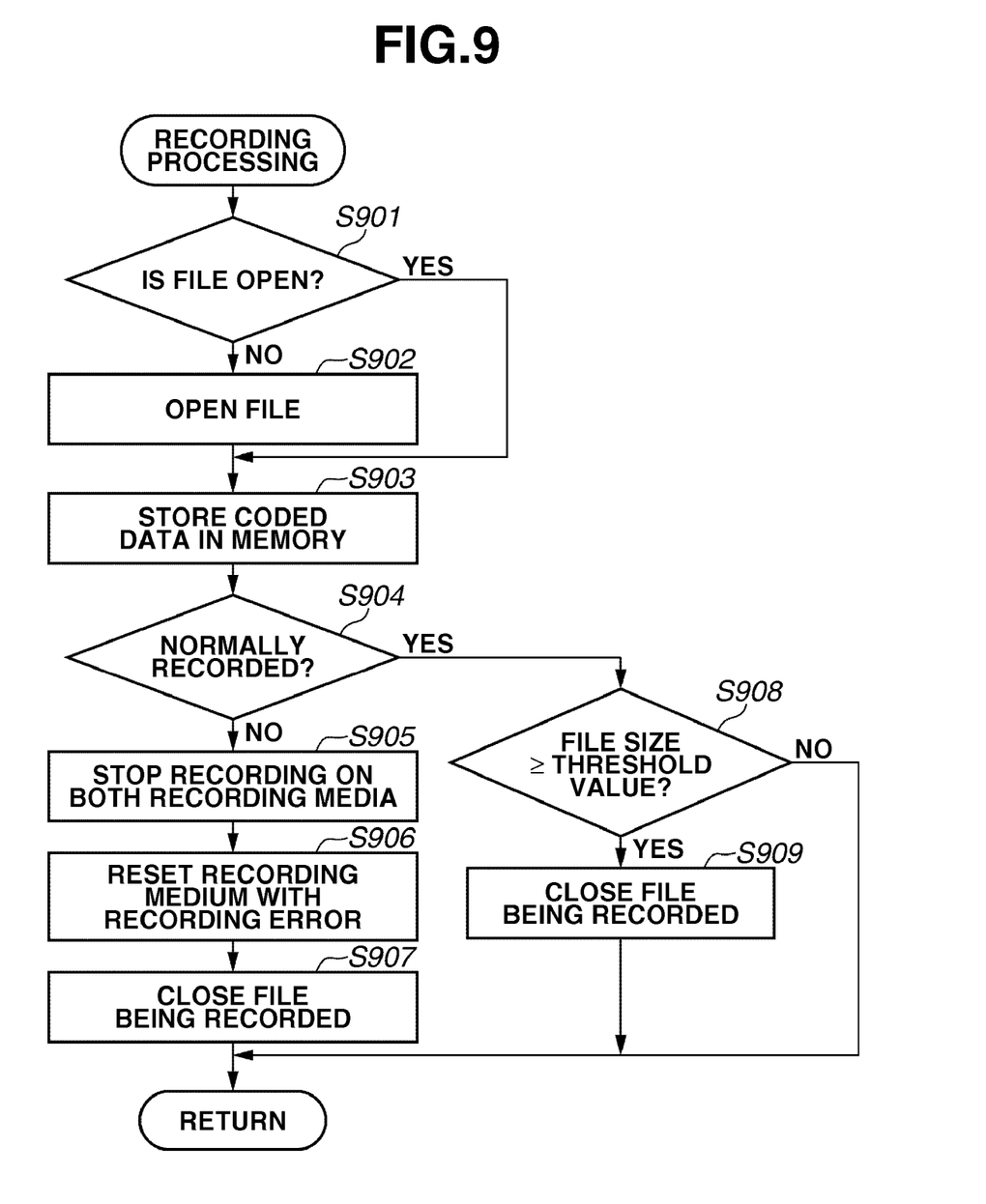
FIG. 9 is a flowchart illustrating simultaneous recording processing.

FIG. 9 is a flowchart illustrating the recording processing of steps S607 and S612 illustrated in FIG. 6 according to the present embodiment. In step S901, the recording medium control unit 106 determines whether the files of the recording media 108 and 109 are open. If the files are not open (NO in step S901), the process proceeds to step S902. In step S902, a new file is generated and opened in each of the recording media. In step S903, the coded data is recorded in each of the current open files of the recording media.

At this time, as described below, if the reset processing in step S906 is not yet completed and the files cannot be generated, the generation of the files and the writing of the coded data are not performed until the reset processing is completed. During this time, the coded data is sequentially stored in the memory 105.

On the other hand, in step S901, if the files of both of the recording media are open (YES in step S901), then the process proceeds to step S903. In step S903, the recording medium control unit 106 writes the coded data in the current open files of the recording media.

In step S904, whether the data is written normally onto the recording media is determined. If a writing error is detected and the writing is not performed normally (NO in step S904), the process proceeds to step S905. In step S905, the recording medium control unit 106 stops the writing processing onto the recording media 108 and 109.

In step S906, the reset operation of the recording medium with the recording error is executed. In step S907, the file in the normally-recorded recording medium without any error and in process of recording is closed. At this time, if the coded data stored in the memory 105 is being recorded, the file is closed when the writing of the data which is to be written in one writing operation is completed and the update of the file system data is completed.

If a writing error occurs, the recording medium control unit 106 notifies the control unit 102 of the name of the file which is being recorded in a normally-recorded recording medium. Further, a name of the file which has been recorded before the occurrence of the writing error and the name of the file which is recorded when the recording of the coded data is resumed after the occurrence of the writing error is notified by the recording medium control unit 106 to the control unit 102. Accordingly, the control unit 102 can detect the moving image file which has been recorded in one recording medium while a writing error has occurred in the other recording medium and the recording has been stopped. Further, the control unit 102 can detect the file which is recorded before and after the writing error occurred.

In step S904, if the coded data is determined as normally written (YES in step S904), the process proceeds to step S908. In step S908, the size of the coded data being written in the file of each recording medium and the file division threshold value are compared. If the file size is smaller than the file division threshold value (NO in step S908), the process returns to the processing in FIG. 6. On the other hand, if the file size is greater than or equal to the file division threshold value (YES in step S908), the process proceeds to step S909. In step S909, the current open file is closed, and the process returns to the processing in FIG. 6.

Figure 4B:
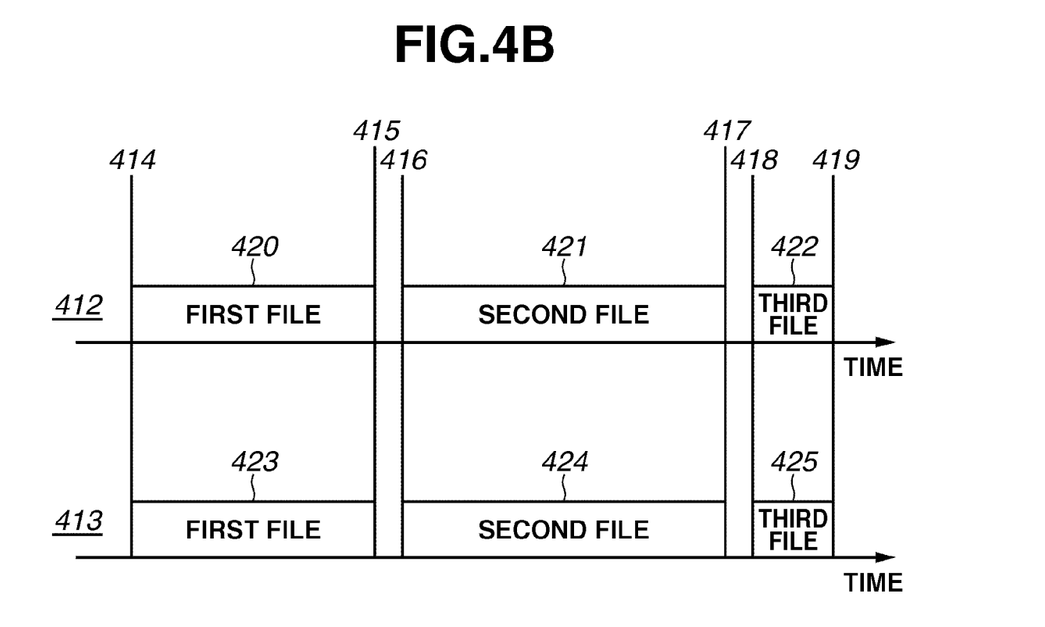

FIG. 4B illustrates a moving image file recorded onto the recording media 108 and 109 according to the present embodiment.

In FIG. 4B, files 412 and 413 are moving image files recorded onto the recording media 108 and 109. When a recording start instruction is given at timing 414, a file is opened for each of the recording media 108 and 109, and first moving image files 420 and 423 are recorded. At timing 415, if a writing error of the recording medium 109 is detected, the recording onto the recording medium 109 is stopped. At the same time, the recording onto the recording medium 108 is also stopped, and the first moving image file 420 is closed. Thus, the coded data corresponding to the file system data updated just before the writing error occurred is written normally in the first moving image file 423.

Further, at this point in time, no file is open in the two recording media. Thus, after the reset of the recording medium 109 is completed, at timing 416, second moving image files 421 and 424 are generated for the recording media 108 and 109 and the coded data is recorded.

When the size of each of the second moving image files reaches the threshold value, the second moving image files 421 and 424 being recorded in the recording media 108 and 109 are closed. Then at timing 418, third moving image files 422 and 425 are generated for the recording media 108 and 109, and the coded data is recorded. After then, at timing 419, if a recording stop instruction is received, the coding is stopped. After the writing of the rest of the coded data is completed, the files are closed.

If the recording of the moving image is stopped, the control unit 102 detects the first moving image file 420 which was being recorded in the recording medium 108 when the recording error has occurred during the recording of the first moving image file 423. Then, by the recording medium control unit 106, the first moving image file 420 is reproduced from the recording medium 108 and recorded onto the recording medium 109. In this way, the first moving image file 421 is copied.

According to the present embodiment, even if a writing error occurs, the recording can be resumed for each file. Accordingly, by copying only a file corresponding to the file with the writing error, a same data can be recorded onto two recording media shortly after the recording is completed.

Further, according to the present embodiment, if a writing error is detected during simultaneous recording, the recording onto two recording media is cancelled. Then, the recording medium with the writing error is reset. When the reset processing is completed, a new file is generated for both of the recording media, and simultaneous recording is resumed. Thus, the file size of the file which is copied after the recording is completed can be made smaller, and the time necessary in copying can be reduced.

Other Embodiments

Each means that constitutes the recording apparatus and each step used in the recording method according to the above-described exemplary embodiments can be realized by running a program stored in a RAM or a ROM of a computer. The present invention includes such a program and a computer-readable recording medium storing the program.

The above-described exemplary embodiments can be also realized by, for example, a system, an apparatus, a method, a program, or a storage medium. Furthermore, the above-described exemplary embodiments can be realized by a system including a plurality of devices or an apparatus including a single device.

The above-described exemplary embodiments can also be achieved by supplying a software program (i.e., programs corresponding to the flowcharts in FIGS. 2 and 6) that realizes each function of the aforementioned exemplary embodiments, directly or by remote operation, to the system or the apparatus, and, a computer included in the system or the apparatus reads out and executes the provided program code.

Thus, the program code itself which is installed in the computer to realize the function and the processing of the present invention on the computer constitutes the above-described embodiments. In other words, the computer-executable program configured to realize the function and the processing of the present invention itself constitutes an exemplary embodiment of the present invention.

In this case, a form of the program can be in any form, such as object code, a program executed by an interpreter, or script data supplied to an operating system (OS) so long as the computer-executable program has a function of a program.

A recording medium for supplying the program includes, for example, a flexible disk, a hard disk, an optical disk, a magneto-optical disc (MO), a compact disc read-only memory (CD-ROM), a compact disc recordable (CD-R), a compact disc rewritable (CD-RW), a magnetic tape, a non-volatile memory card, a ROM, and a digital versatile disc (DVD) (DVD-ROM and digital versatile disc recordable (DVD-R)).

The program can be supplied to a user by connecting to an Internet website using a browser of a client computer and downloading the computer-executable program of the present invention or a compressed file including an automated installation function into a recording medium, such as a hard disk.

Further, the program code that configures the program of the exemplary embodiments of the present invention can be divided into a plurality of files and each file can be downloaded from different Internet websites. In other words, a World Wide Web (WWW) server or a file transfer protocol which allows a plurality of users to download the program files to realize the functions of the above-described exemplary embodiments also configures the present invention.

Further, the program according to the exemplary embodiments of the present invention can be encrypted, stored in a storage medium, such as a CD-ROM, and delivered to users. In this case, a user who satisfies a predetermined condition is allowed to download decryption key information from an Internet website via the Internet, decrypt the encrypted program using the decryption key information, and install the decrypted program on the computer.

A function of the above-described exemplary embodiments is realized not only when the computer executes the program code. For example, an OS or the like which runs on a computer can execute a part or whole of the actual processing based on an instruction of the program so that the function of the above-described exemplary embodiments can be achieved.

Furthermore, the program read out from the storage medium is written in a memory in a function expanding board inserted in a computer or a function expanding unit connected to the computer, and a CPU provided in the function expanding board or the function expanding unit performs the whole or a part of the actual processing based on an instruction from the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-102165 filed Apr. 20, 2009 and Application No. 2010-086388 filed Apr. 2, 2010 which are hereby incorporated by reference herein in their entirety.

What is claimed is:

1. A recording apparatus comprising:
a recording unit configured to record moving image data on a plurality of recording media as a file, wherein if a file size reaches a predetermined size during recording of the moving image data, the recording unit stops the recording of the moving image data in the file being recorded and generates a new file so that the moving image data can be recorded;
a detection unit configured to detect a recording error while the moving image data is being recorded onto the recording media;
a control unit configured to control the recording unit according to an output of the detection unit, wherein when the moving image data is simultaneously recorded onto the plurality of recording media, if a recording error with respect to one recording medium is detected, the control unit controls the recording unit such that the recording of the moving image data on the one recording medium is stopped while the recording of the moving image data onto another recording media is continued, and if a new file is generated in another recording media after recording of the moving image data on the one recording medium is stopped, a new file is generated in the one recording medium and recording of the moving image data is resumed.

2. An apparatus according to claim 1, wherein the recording unit generates the file of the moving image data according to a predetermined file system, and wherein the predetermined size is an upper limit of the file size defined by the file system.

3. An apparatus according to claim 1, wherein after the recording stop of the moving image data on the one recording medium, if a recording error is detected with respect to another recording media, the control unit controls the recording unit such that after stopping recording of the moving image data on another recording media, a new file is generated for the one recording medium and another recording media, and the recording of the moving image data is resumed.

4. An apparatus according to claim 1, wherein the control unit controls the recording unit such that a file recorded onto another recording media while the recording of the moving image data on the one recording medium is stopped, copied to the one recording medium from another recording media.

5. An apparatus according to claim 1, wherein after the recording error with respect to the one recording medium is detected, the control unit controls the recording unit such that control information used for controlling reproduction order of a plurality of files recorded onto the one recording medium is recorded onto the one recording medium, and the newly generated file and a file copied from another recording media to the one recording medium are consecutively reproduced.

6. A recording apparatus comprising:
an input unit configured to input information data;
a recording unit configured to record information data output from the input unit on a first recording medium and a second recording medium different from the first recording medium as a file;
a detection unit configured to detect a recording error during recording of information data on the first recording medium and the second recording medium;
a control unit configured to control the recording unit according to an output of the detection unit, wherein when the information data input by the input unit is recorded on the first recording medium by the recording unit while recorded on the second recording medium by the recording unit, if a recording error of the first recording medium is detected by the detection unit, the control unit controls the recording unit such that the recording of the information data on the first recording medium is stopped, and the control unit controls the recording unit such that a file being recorded on the second recording medium when the recording of the information data on the first recording medium is stopped is copied from the second recording medium to the first recording medium according to the output of the detection unit.

7. An apparatus according to claim 6, wherein the recording unit continues the recording of the information data on the second recording medium after the recording of the information data on the first recording medium is stopped, and stops the recording of the information data on the second recording medium when a size of the file recorded on the second recording medium reaches a predetermined size.

8. An apparatus according to claim 6, wherein the recording unit stops the recording of the information data on the second recording medium in accordance with a recording stop of the information data on the first recording medium.

* * * * *